United States Patent [19]

Sobolewski

[11] Patent Number: 4,457,238
[45] Date of Patent: * Jul. 3, 1984

[54] RAILWAY TRUCK; PIVOTAL CONNECTION

[75] Inventor: George Sobolewski, Laval West, Canada

[73] Assignee: Urban Transportation Development Corporation Ltd., Toronto, Canada

[ * ] Notice: The portion of the term of this patent subsequent to Sep. 9, 1980 has been disclaimed.

[21] Appl. No.: 184,150

[22] Filed: Sep. 4, 1980

Related U.S. Application Data

[63] Continuation of Ser. No. 890,318, Mar. 27, 1978, Pat. No. 4,221,172.

[51] Int. Cl.³ .................. B61F 3/08; B61F 5/22; B61F 5/44
[52] U.S. Cl. .......................... 105/168; 105/171; 105/179; 105/197 B
[58] Field of Search ............... 105/165, 166, 167, 168, 105/171, 176, 182 R, 182 E, 199 R, 200, 202, 224.18, 169, 170, 179, 224.12, 197

[56] References Cited

U.S. PATENT DOCUMENTS

| | | | |
|---|---|---|---|
| 205,956 | 7/1878 | Hamilton et al. | 105/165 |
| 220,928 | 10/1879 | Marsters | 105/165 |
| 444,181 | 1/1891 | Robinson | 105/168 |
| 450,157 | 4/1891 | Hubbard | 105/199 |
| 450,813 | 4/1891 | Lamb et al. | 105/171 |
| 461,680 | 10/1891 | Hunt | 105/165 |
| 1,064,167 | 6/1913 | Pintner | 105/165 |
| 1,147,430 | 7/1915 | Pflager | 105/179 |
| 1,576,298 | 3/1926 | Barbey et al. | 105/179 |
| 1,707,046 | 3/1929 | Boyden | 105/165 |
| 2,296,106 | 9/1942 | Holland et al. | 105/167 |
| 2,908,230 | 10/1959 | Dean | 105/182 R |
| 3,528,374 | 9/1970 | Wickens | 105/165 X |
| 3,789,770 | 2/1974 | List | 105/168 |
| 3,799,066 | 3/1974 | Jackson | 105/182 R |
| 4,003,316 | 1/1977 | Monselle | 105/224.1 X |
| 4,131,069 | 12/1978 | List | 105/176 X |
| 4,167,906 | 9/1979 | Steinmann et al. | 105/168 |
| 4,221,172 | 9/1980 | Sobolewski | 105/168 |

FOREIGN PATENT DOCUMENTS

| | | | |
|---|---|---|---|
| 450709 | 1/1972 | Australia | 105/168 |
| 1018404 | 10/1977 | Canada | 105/168 |
| 558576 | 9/1932 | Fed. Rep. of Germany | 105/165 |
| 837711 | 5/1952 | Fed. Rep. of Germany | 105/168 |

OTHER PUBLICATIONS

Railway Age, Letters, 1979, Radial Axle Trucks: The Swiss Connection.
Rail Engineering International, Oct. 1974, Schwnack, Ulrich, "Wheelset Steering for Bogies of Railway Vehicles".

*Primary Examiner*—Robert B. Reeves
*Assistant Examiner*—Howard Beltran
*Attorney, Agent, or Firm*—Norbert P. Holler; Charles A. Blank

[57] ABSTRACT

A railway truck assembly adapted to produce steering of the wheel axles radially to a curve to reduce wear and noise and characterized by a pivot connection between the bolster and the truck frame elements which; in cooperation with direct transmission of the load to the truck frame through the opposite ends of the bolster, allows to use a relatively thinner and centrally non-bulging bolster. Thus, more space is made available between the central portion of the bolster and the top of the rails; which space is advantageously used to install some equipment such as for instance a linear induction motor or LIM. This railway truck assembly comprises a bolster which is substantially bodily displaceable with the car body, a pair of side frames, laterally restrained relative to the bolster and supporting the opposite ends respectively of the bolster, a pair of steering yokes longitudinally restrained relative to the car body and pivoted one to the other for radial steering of the wheel axles connected to them respectively, the side frame being slidably supported by the yokes and laterally restrained relative to the latter, and links producing the aforementioned restraints respectively.

24 Claims, 8 Drawing Figures

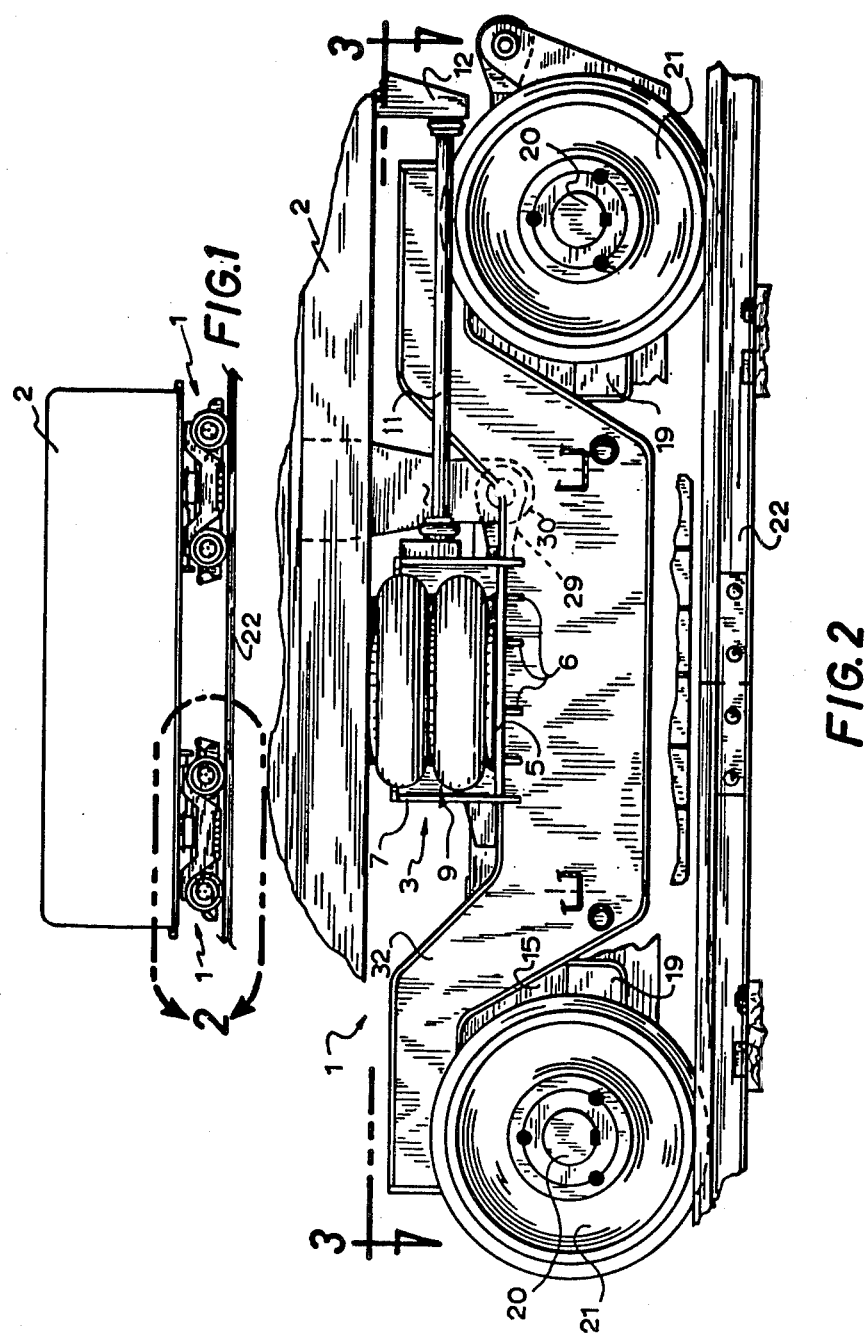

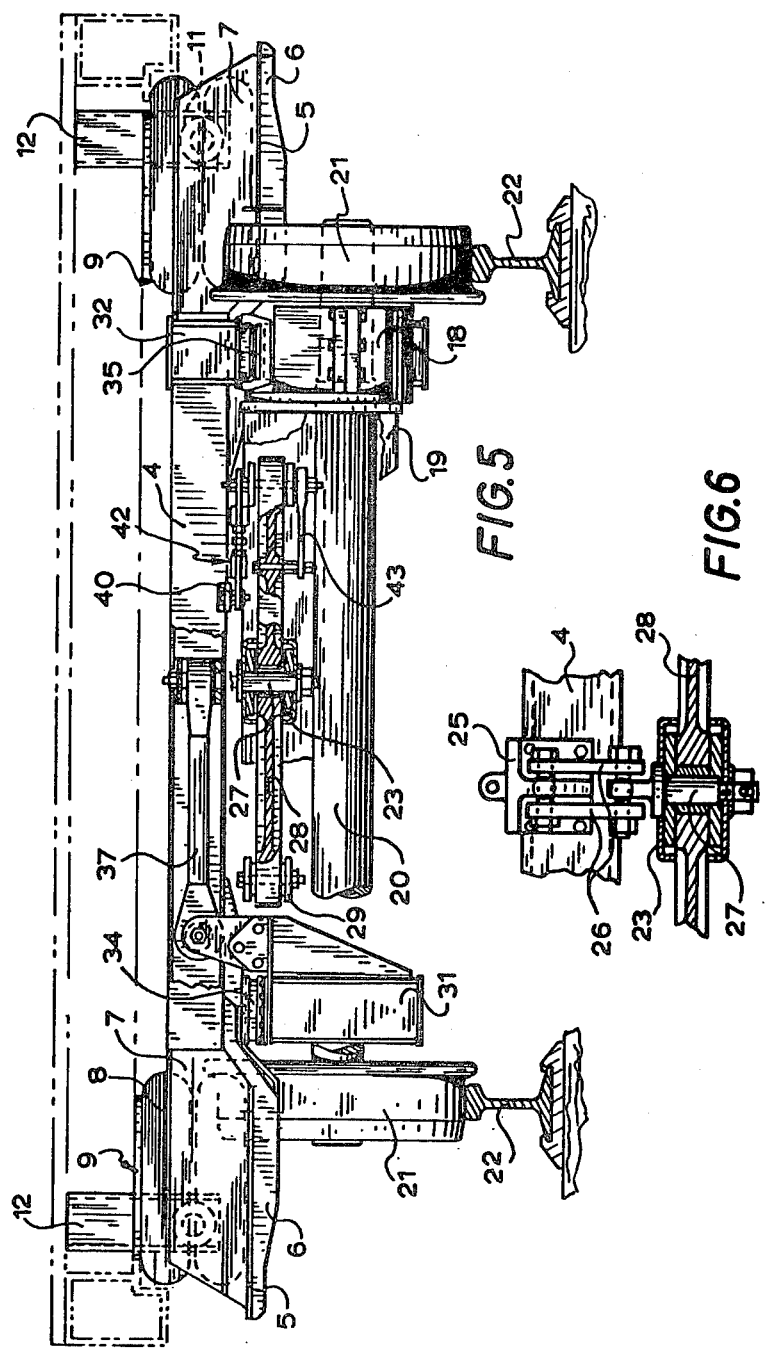

RAILWAY TRUCK; PIVOTAL CONNECTION

This is a continuation of application Ser. No. 890,318, filed Mar. 27, 1978, now U.S. Pat. No. 4,221,172 issued Sept. 9, 1980.

This invention relates to a railway truck assembly, and more particularly, to the pivotal connection in a railway truck designed for a rapid transit system.

The conventional railway trucks have been designed to meet substantially less stringent requirements than those which have to be met by the trucks for the urban rapid transit systems now on the drawing boards and/or under development for the next generation. Such urban transit systems are required to be substantially less noisy, to be able to negotiate curves much sharper than those of conventional railroads, and to be lighter and thus more compatible with energy conservation.

The ability for a railway truck to negotiate relatively sharp curves with a minimum of wear and noise has been provided by steering the wheel axles always radially to the curve. A truck adapted to produce such steering is defined in U.S. Pat. No. 3,789,770. The railway truck of these patents essentially includes a pair of yokes pivoted one to the other about a vertical axis and connected to the wheel axles respectively which by such pivoting will be steered each to a radial position relative to a curve.

It is a general object of the present invention to provide a railway truck of the above type which provides a centerless pivot connection between the bolster and the truck frame elements.

It is another object of the present invention to provide a railway truck assembly having a pivot connection which in cooperation with the transmission of the car load directly through the ends of the bolster allows to use thin and non-bulging bolster thereby increasing the underlying central space and reducing the weight of the overall truck assembly.

It is a further object of the present invention to provide a railway truck assembly which takes advantage of the small angular displacements involved to use link connections simply having swivelling rod ends to allow the necessary freedom of pivoting and twisting motions between the movable components.

The above and other objects and advantages of the present invention will be better understood with reference to the following detailed description of a preferred embodiment thereof which is illustrated, by way of example, in the accompanying drawings; in which:

FIG. 1 is a side elevation view of a railway car provided with a pair of railway trucks according to the present invention;

FIG. 2 is a side elevation view of a railway truck assembly according to the present invention;

Figure 3:
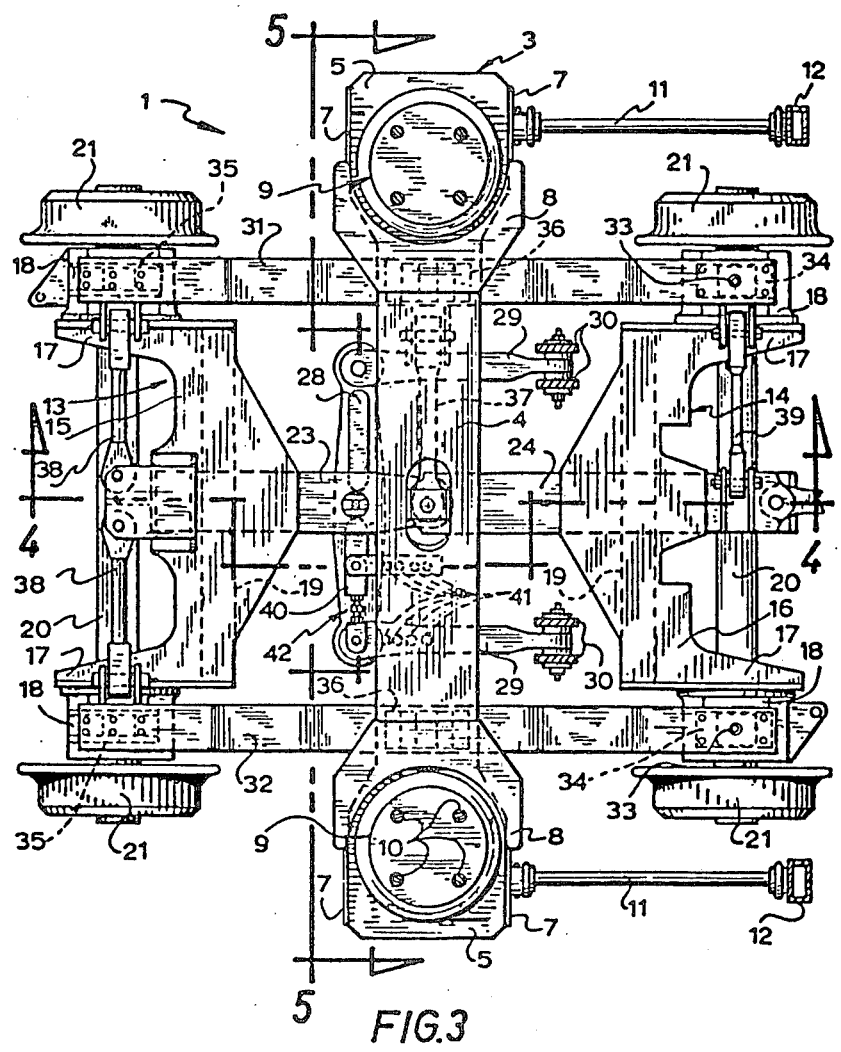
FIG. 3 is a top plan view of the railway truck assembly as seen along line 3—3 of FIG. 2.
Figure 4:
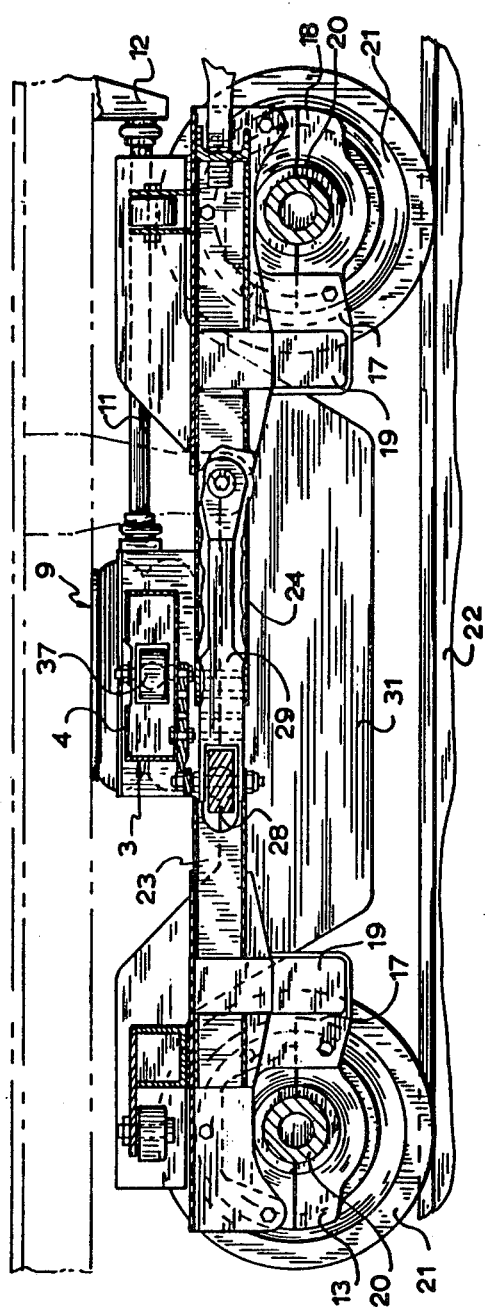
Figure 7:
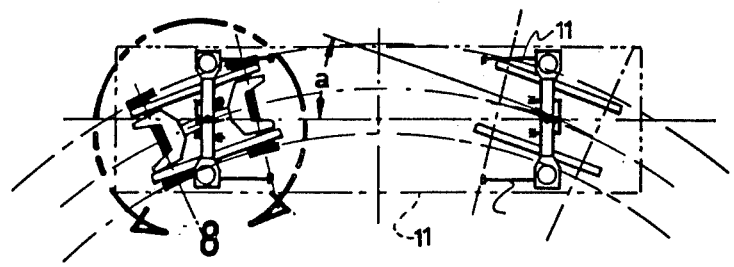
Figure 8:
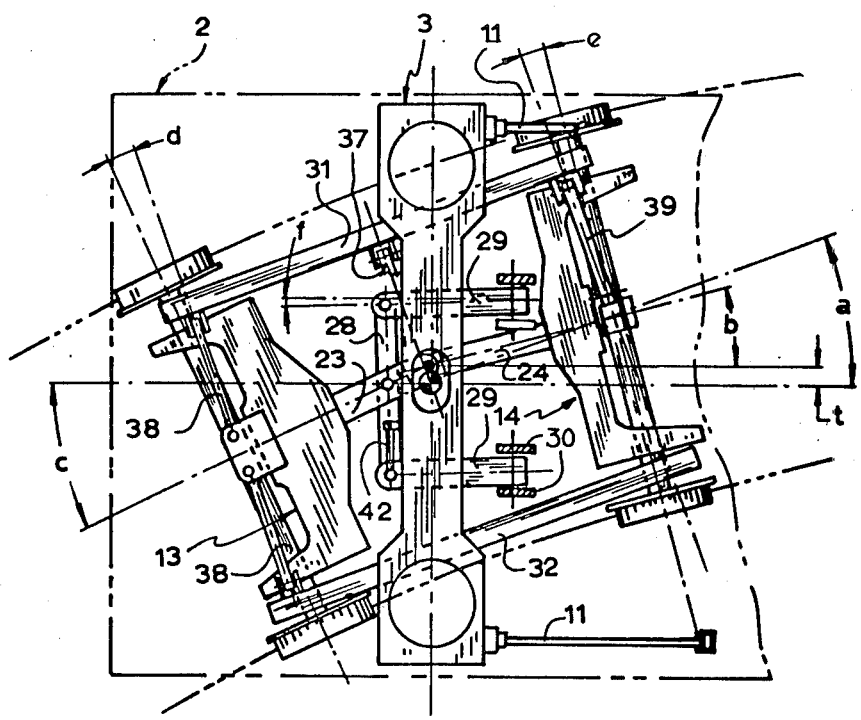

FIGS. 4 and 5 are longitudinal and transverse cross-sectional views as seen along lines 4—4 and 5—5 respectively in FIG. 3;

FIG. 6 is an enlarged detail view of a suspension link and pin assembly as seen along line 5—5 in FIG. 3;

FIG. 7 is a schematic diagram giving in plan view the pivotal relationship between the pivoting elements of a pair of trucks and the railway car body carried by the trucks; and FIG. 8 is an enlarged view of the left truck of FIG. 7.

The railway truck 1 according to the present invention, as shown in FIG. 1, is used in a pair to carry a car body 2 of any desired construction. The railway truck 1 forms part of a railway truck assembly also comprising a bolster 3 and the associated elements to support the car body.

The bolster 3 includes a central portion 4 of tubular construction having a uniform square cross section, as best shown in FIGS. 3 and 4. Each end of the bolster 3 includes a baseplate portion 5 which is positioned lower than the central bolster portion 4. Stiffening ribs 6 are secured against the bottom of each baseplate portion 5 and extend longitudinally of the bolster. Each baseplate portion 5 is provided with a pair of side plates 7 upwardly extending edgewise along the opposite sides thereof. A generally C shape top plate 8 is fixed on the upper edge of each pair of adjacent side plates 7 to cooperatively form with the latter and with the corresponding baseplate portion 5 a protected recess for an air spring unit 9. The latter may be of any appropriate and known construction currently used in the art. The two air springs 9 of each bolster 3 are fixed to the railway car body 2, such as by bolts 10 and carry the load of the corresponding end of the car body. The two side plates 7 on the inboard side of the bolster 3 are connected to the car body 2 by means of a pair of bolster drag links or rods 11. More specifically, each bolster drag link or rod 11 has one end pivoted to the corresponding side plate 7 of the bolster and the other end pivotally connected to a bracket 12 fixedly secured to and downwardly projecting from the bottom of the railway car body so that the bolster 3 is connected to the car body for movement in a horizontal plane. The opposite ends of each bolster drag link 11 are vertically pivoted to accommodate the springing movement between the car body and the bolster and they are also provided with resiliently twisting rod ends to accommodate the very small transverse displacement of the car body relative to the bolster.

The railway truck assembly further includes an outboard and an inboard yokes 13 and 14 respectively. The outboard yoke 13 includes a main frame 15 while the inboard yoke 14 includes a main frame 16. Each main frame 15 and 16 includes a pair of laterally spaced apart projections 17 to which is secured a journal housing 18. Each main frame 15 and 16 is formed with an underlying transverse beam portion 19. The journal housings 18 of each yoke 13 and 14 rotatably retain a wheel axle 20 having a flanged wheel 21 on each of the two opposite outer ends thereof. Thus, the flanged wheels 21 are adapted to carry the yokes and the remainder of the railway truck assembly rollably on rails 22.

The outboard yoke 13 is provided with a longitudinal bar 23 rigidly secured centrally to the main frame 15 and projecting inboard therefrom. Similarly, the main frame 16 is provided with a longitudinal bar 24 which is rigidly secured centrally thereto and projects outboard therefrom. The two bars 23 and 24 have their free end pivoted one to the other at equal distances from the wheel axles 20 and thus, centrally under the bolster 3.

A bracket 25 is fixedly secured against the outboard side of the bolster 3 and at the center thereof. A pair of yoke suspension links 26 are pivoted at the upper end to the bracket 25 and at the lower end to the head of a vertical pivot pin 27. The latter is arranged to pivotally suspend the free end of the bar 23 of the outboard yoke 13. Due to the above described pivotal connection between the free end of the bars 23 and 24, the pivot pin 27 effectively supports both bars relative to the bolster.

A steering crossbar 28 transversely extends through the yoke bar 23 and is centrally pivoted therein by the pivot pin 27. A pair of yoke drag links or rods 29 are pivotally connected at one end to a corresponding end of the steering crossbar 28 and at the other end to a bracket 30 rigidly depending from the car body 2. Each end of the links or rods 29 is pivotally connected by a resilient twistable rod end to allow restricted twisting as well as rotation at each such end. It must be noted that the inboard end of each drag link or rod 29 is pivoted about an horizontal axis to allow for the resilient suspension between the car body and the yokes. The other or outboard end of each drag link is pivoted about an upright axis relative to the steering crossbar 28.

A pair of side frames 31 and 32 are positioned on the opposite sides respectively of the railway truck and longitudinally extend parallel one to the other. Each side frame has its inboard end pivoted at 33 on the corresponding journal housing 18 and resting on a resilient pad 34. Each side frame has its outboard end resting on a sliding pad 35. Each end of the bolster 3 rests on a sliding pad 36 at the center of the corresponding side frame. Thus, the load of the railway car 2 is transmitted directly through the air springs 9, and the opposite ends of the bolster 3 onto the sliding pads 36 at the center of the side frames 31 and 32. The sliding pads 35 and 36 allow relative longitudinally displacement between the journal bearings 18 or yokes 13, 14, and between the bolster 3 and the side frame. Such displacement occurs in a curve upon angular displacement of the car body 2 and bolster 3 therewith relative to the side frames and the railway truck as a whole. As will be explained later, the angular displacement of the truck relative to the car body steers the yokes 13, 14 to align the wheel axles 20 radially to the curve. Such steering displacement of the yokes results in relative sliding between the yokes and the side frames 31, 32 on the sliding pads 35.

A lateral stabilizing link or rod 37 extends laterally of the truck and is pivotally connected to the central portion of the bolster 3 and to the side frame 31. The link 37 is pivotally connected to the bolster 3 on a vertical axis coincident with the connection between the free ends of the yoke bars 23, 24 so that the bolster 3 is constrained to pivot with the car body about the vertical axis. This anchor rod or link 37 accurately restrains the side frame 31 in lateral direction. A set of three yoke centering links 38, 38, 39 extend laterally and are pivotally connected at one end to one end of a side frame and at the other end, near the center line of the corresponding yoke. These links 38, 38 and 39 are provided to center the side frames 31, 32.

The steering actuation device to actuate the steering crossbar 28 comprises an arm 40 which is fixedly secured to the central portion 4 of the bolster and extends longitudinally of the railway car body 2. Each of this arm 40 and the adjacent drag link 29 is provided with a series of adjustment holes 41 spaced apart along the length thereof. An adjustable link 42 is pivotally connected in any one of the holes 41. A stabilizing link 43 is connected parallel to and under the crossbar 28 to stabilize the pivot pin through the end of the cross-bar to resist the action thereon by the actuating link 42.

The detailed operation of the railway truck assembly will now be explained in details with particular reference to FIGS. 7 and 8. When the railway car is in a curve, the body 2 thereof comes at an angle "a" relative to the longitudinal axis of the railway truck 1. Since the bolsters 3 are restrained relative to the car body, they also make the same angle relative to the trucks 1.

The reference link 42 acts to keep the steering crossbar 28 laterally centered with respect to the car body. This will shift the yoke sufficiently with respect to the truck center line to pivot both yokes 13 and 14 in opposite directions such that both wheel axles 20 will take a radial alignment relative to the curve.

It must be noted that when the steering actuator or reference link 42 is in the predetermined position of alignment with the steering crossbar 27, as shown in FIG. 3, the mere lateral motion of the car body, as may be caused by irregularities in the railway track, merely laterally shifts the pivotal connections to the brackets 30 and laterally pivots the drag links 29 about their other end. Since the bolster and link 42 then do not move with the car body the vertical alignment and connection of the outer end of the link 42 with the corresponding end of the steering crossbar 28 causes that outer end to operate as a fulcrum for the corresponding drag link 29. Thus, the steering crossbar 28 is not displaced endwise transversely of the car body when the latter is subjected to mere lateral motions. If however, it is desired for any particular application such as to a freight car, the reference link 42 could be connected into another pair of holes 41. In such case, the fulcrum thus provided by the outer end of link 42 that is connected to the drag link 29 produces a predetermined leverage action to laterally displace the steering crossbar in response to even mere lateral motions of the car body.

Although the curves for a rapid transit system are sharper than those for the conventional railroads, the maximum steering angle of each wheel axle 20 is limited to about 2½ degrees. FIGS. 7 and 8 are exaggerating the relative angular pivoting between the pivotable components. In fact, the bars 23 and 24 only slightly shift laterally and thus the upright pivot between the two only slightly shifts sideways from alignment with the pivot center of the trucks relative to the car body.

What is claimed is:

1. A steerable truck to support a body of a vehicle comprising a pair of transverse wheelsets spaced along a longitudinal axis and each rotatable about a respective transverse axis, a pair of yokes each supported by a respective wheelset, said yokes being interconnected for relative movement about a vertical pivot axis, a pair of side frames disposed on opposite sides of said pivot axis and each extending between and supported upon said yokes, means to permit relative movement between said side frames and said yokes to accommodate relative pivotal movement of said yokes about said pivot axis, lateral link means extending between at least one of said yokes and said side frames to locate said side frames relative to said yokes, said link means including connecting means to accommodate relative longitudinal movement between said yoke and said side frames and independent vertical movement of one side frame relative to the other upon tilting of said yoke, a support means to support said vehicle body upon said side frames intermediate said axle assemblies and permit rotation of said vehicle body relative to said side frames and means to transfer draft loads from said body to said truck.

2. A steerable truck according to claim 1 wherein said connecting means includes a universal connection between said link means and said yoke.

3. A steerable truck according to claim 2 wherein said link means includes a pair of lateral links, each extending between said yoke and a respective one of said side frames.

4. A steerable truck according to claim 3 wherein each of said links is universally jointed to said yoke and to said respective side frame to accommodate movement about horizontal and vertial axes.

5. A steerable truck according to claim 1 wherein one end of each of said side frames is pin jointed to the other of said yokes for longitudinal and lateral movement therewith.

6. A steerable truck according to claim 5 wherein the other end of each of said side frames is slidably supported on said one of said yokes.

7. A steerable truck according to claim 1 wherein said rotatably supporting means for said bolster includes a strut extending between one of said side frames and said bolster to laterally locate said bolster relative to said side frame.

8. A steerable truck according to claim 7 wherein said strut is pivotally connected to said bolster for movement about a vertical axis to permit relative pivotal movement between said side frames and said bolster.

9. A steerable truck for a vehicle comprising a pair of transverse wheelsets spaced along a longitudinal axis and each rotatable about a respective transverse axis, a pair of yokes each supported by a respective wheelset, said yokes being interconnected for movement about a vertical pivot axis, a pair of side frames diposed on opposite sides of said pivot axis and each extending between and supported upon said yokes, one end of each of said side frames being pivotally connected to one of said yokes for movement therewith and the other end of each of said side frames being slidably supported on the other of said yokes, a pair of lateral links connected between said other yoke and said other end of said side frames, each of said links being connected to said side frames and said other yoke by joint means permitting movement to accommodate relative movement between said side frames and said other yoke whilst laterally locating said side frames, a transverse bolster to support a vehicle, means acting between said bolster and said side frames to support rotatably said bolster on said side frames intermediate said axle assemblies, and draft means to transfer draft loads from said body to said truck, said side frames thereby being independently movable to accommodate torsional displacement of one of said wheelsets relative to the other.

10. A steerable truck according to claim 9 wherein said bolster is laterally located on said side frames by means of a strut extending between one of said side frames and said bolster.

11. A steerable truck according to claim 10 wherein a lateral link is connected between said one yoke and said one side frame.

12. A steerable truck according to claim 11 wherein the connections of said lateral links and said strut are located in a common horizontal plane.

13. A steerable truck according to claim 12 wherein said strut is pivotally connected to said bolster for movement about an axis coincident with said vertical pivot axis.

14. A vehicle including a body supported on a steerable truck, said truck comprising a pair of transverse wheelsets spaced apart along a longitudinal axis and each rotatable about a respective transverse axis, a pair of yokes each supported by a respective one of said axles, said yokes being connected to one another for relative movement about a vertical pivot axis, a truck frame supported by said yokes, support means to support said vehicle body on said truck frame and permit rotation of said body relative to said truck frame, a pair of transversely spaced longitudinally disposed draft links connected at one end to said vehicle body and at the other end to opposite ends of a transverse link, said link being pivotally connected intermediate its ends to one of said yokes whereby draft forces are transmitted directly from said yoke to said body.

15. A vehicle according to claim 14 wherein said draft links are connected to said body by horizontal pivot connections which permit movement about a horizontal axis to accommodate relative vertical movement between said body and said truck.

16. A vehicle according to claim 15 wherein said draft links are connected to said transverse link by vertical pivot connections which permit movement between said transverse link and said draft links about a vertical pivot axis thereby to accommodate transverse displacement of said body relative to said truck.

17. A vehicle according to claim 14 wherein the connections of said draft links to said body and to said transverse links are universal connections and define a parallelogram, said connections thereby accommodating displacement of said body relative to said truck without inducing relative pivotal motion between said yokes through said transverse link.

18. A vehicle according to claim 17 including link means operatively connected between said bolster and one of said yokes, said link means inducing steering motion of said yokes about said vertical axis upon rotation of said bolster relative to said truck frame.

19. A vehicle according to claim 18 wherein said link means is connected between said bolster and one of said draft links, said link means being engageable with said draft link at a location spaced from said univérsal connections so that upon lateral displacement of said truck relative to said body, said link means induces pivotal movement of said yokes about said vertical axis to steer said truck to reduce said lateral displacement.

20. A vehicle according to claim 19 wherein said link means includes a strut connected at one end to said bolster and at the other end to said one draft link and extending generally parallel to said transverse link.

21. A vehicle including body supported on a steerable truck, said steerable truck having a pair of wheelsets spaced apart along a longitudinal axis and said rotatable about a transverse axis, a pair of yokes, each supported by a wheelset, said yokes being pivotally interconnected for steering motion about a vertical pivot axis, a main frame supported on said yokes and connected thereto to permit pivotal movement of said yokes about said vertical axis, and a bolster supported on said main frame for movement in a generally horizontal plane relative thereto and connected to said body to provide support therefor, said vehicle including a draft linkage extending between said body and one of said yokes to transmit draft forces from said yoke to said body and link means connected between said bolster and said draft linkage whereby lateral displacement of said bolster relative to said body causes said draft linkage to induce relative rotation of said yokes to steer said truck in a direction to reduce said lateral displacement.

22. A vehicle according to claim 21 wherein said draft linkage includes a pair of longitudinal draft links transversely spaced from one another and connected at one end to said body and at the other end to opposite ends of a transverse link, said transverse link being pivotally connected intermediate its end to said one yoke.

23. A vehicle according to claim 22 wherein said link means is connected to one of said draft links intermediate its ends.

24. A vehicle according to claim 23 wherein said link means includes a strut member connected between said bolster and said one draft links and disposed generally parallel to said transverse link.

* * * * *

UNITED STATES PATENT AND TRADEMARK OFFICE
CERTIFICATE OF CORRECTION

PATENT NO. : 4,457,238
DATED : July 3, 1984
INVENTOR(S) : Sobolewski, George & Laval, West It is certified that error appears in the above-identified patent and that said Letters Patent is hereby corrected as shown below:

Title page:

In the [*] line change "Sep. 9, 1980" to --Sep. 9, 1997--.

Signed and Sealed this

Nineteenth Day of March 1985

[SEAL]

Attest:

DONALD J. QUIGG

Attesting Officer  Acting Commissioner of Patents and Trademarks